United States Patent
Yoo (10) Patent No.: US 10,675,801 B2
(45) Date of Patent: Jun. 9, 2020

(54) CLAMPING APPARATUS OF INJECTION MOLDING MACHINE

(71) Applicant: LS MTRON LTD., Anyang-si, Gyeonggi-do (KR)

(72) Inventor: Sung Chul Yoo, Anyang-Si (KR)

(73) Assignee: LS MTRON LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/463,303

(22) PCT Filed: Nov. 17, 2017

(86) PCT No.: PCT/KR2017/013099
§ 371 (c)(1),
(2) Date: May 22, 2019

(87) PCT Pub. No.: WO2018/101659
PCT Pub. Date: Jun. 7, 2018

(65) Prior Publication Data
US 2019/0291321 A1  Sep. 26, 2019

(30) Foreign Application Priority Data

Dec. 2, 2016  (KR) .................. 10-2016-0163696
Nov. 8, 2017  (KR) .................. 10-2017-0147863

(51) Int. Cl.
*B29C 45/67*  (2006.01)
*B29C 45/17*  (2006.01)

(52) U.S. Cl.
CPC .............. *B29C 45/67* (2013.01); *B29C 45/17* (2013.01); *B29C 45/1761* (2013.01); *B29C 2045/6742* (2013.01)

(58) Field of Classification Search
CPC ..... B29C 45/17; B29C 45/1761; B29C 45/67; B29C 2045/6742
See application file for complete search history.

(56) References Cited

U.S. PATENT DOCUMENTS

| 4,948,358 A * | 8/1990 | Kushibe .............. B29C 45/6728 425/574 |
| 5,192,557 A * | 3/1993 | Hirata ................. B29C 45/1761 425/589 |
| 6,926,514 B2 * | 8/2005 | Urbanek ............. B29C 45/1761 425/589 |

FOREIGN PATENT DOCUMENTS

JP   2014166692 A   9/2014
KR  1020030042931 A  6/2003

(Continued)

OTHER PUBLICATIONS

International Search Report for related International Application No. PCT/KR2017/013099; report dated Oct. 11, 2018; (5 Pages).

(Continued)

*Primary Examiner* — James P Mackey
(74) *Attorney, Agent, or Firm* — K&L Gates LLP (57) ABSTRACT

The present invention relates to a clamping apparatus of an injection molding machine, comprising: a fixed template; a moving template moving back and forth relative to the fixed template; a plurality of flanges provided with a template fastening hole extending in the horizontal direction so as to be fixed to the fixed template; and a plurality of booster cylinders fixedly mounted on the plurality of flanges and guiding the back and forth movement of the movable template, wherein the fixed template has a plurality of ribs, projecting outward, installed on one surface thereof, each of the plurality of ribs is provided with a seating groove that is depressed inward, and each of the plurality of flanges is disposed in the seating groove to adjust the coupling positions of the plurality of booster cylinders with respect to the fixed template.

13 Claims, 8 Drawing Sheets

(56) References Cited

FOREIGN PATENT DOCUMENTS

| | | |
|---|---|---|
| KR | 1020090092494 A | 2/2008 |
| KR | 1020120010391 A | 2/2012 |
| KR | 1020120096321 A | 8/2012 |
| KR | 1020140060987 A | 5/2014 |
| KR | 1020160123012 A | 10/2016 |

OTHER PUBLICATIONS

Mitten Opinion for related International Application No. PCT/KR2017/013099; report dated Oct. 11, 2018; (4 Pages).

\* cited by examiner

FIG. 1

Prior Art

FIG. 2

Prior Art

CLAMPING APPARATUS OF INJECTION MOLDING MACHINE

CROSS-REFERENCE TO RELATED APPLICATIONS

The present application is a National Stage of International Application No. PCT/KR2017/013099 filed Nov. 17, 2017, which claims priority to Korean Patent Application No. 10-2016-0163696 filed on Dec. 2, 2016 in the Republic of Korea, and Korean Patent Application No. 10-2017-0147863 filed on Nov. 8, 2017 in the Republic of Korea, the disclosures of which are incorporated herein by reference.

TECHNICAL FIELD

The present disclosure relates to a clamping apparatus of an injection molding machine, and more particularly, to a clamping apparatus of an injection molding machine in which a booster cylinder that guides the movement of a moving template relative to a fixed template can be fixedly installed at the fixed template with ease.

BACKGROUND ART

Injection molding is a molding method whereby a plastic material is fluidized by a melting process and injected into a mold. The commonly used injection molding machine for performing injection molding is a hydraulic injection molding machine that opens or closes a mold using the hydraulic pressure.

Korean Patent Publication No. 2009-0092494 discloses the structure of an injection molding machine in which a mold is opened or closed by movement of a moving template relative to a fixed template. This injection molding machine is designed such that a piston rod within a cylinder body is coupled to the moving template and can move back and forth, and as the piston rod moves back and forth, the mold is opened or closed.

Figure 1:
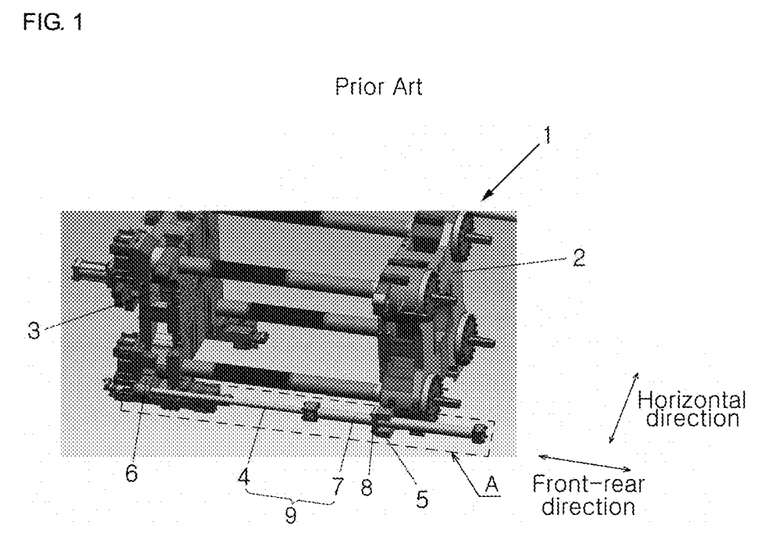
FIG. 1 is a diagram showing a clamping apparatus of an injection molding machine according to the related art.
Figure 2:
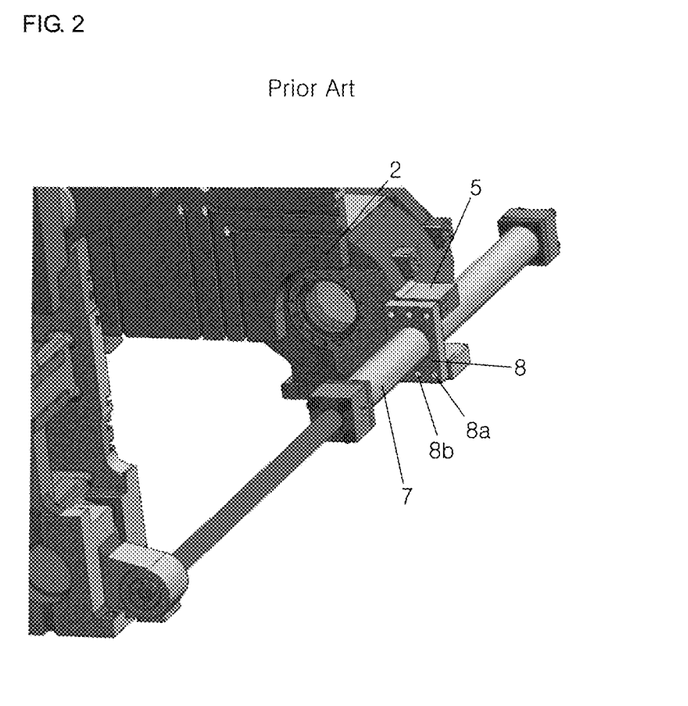
FIG. 2 is an enlarged view of section A of FIG. 1.

An example of the injection molding machine is shown in FIGS. 1 and 2 in detail.

FIG. 1 is a diagram showing a clamping apparatus of an injection molding machine according to the related art. Additionally, FIG. 2 is an enlarged diagram of section A of FIG. 1.

As shown in FIGS. 1 and 2, the clamping apparatus 1 of an injection molding machine includes a fixed template 2 and a moving template 3 that is moveable back and forth relative to the fixed template 2. A fixed mold and a moving mold are installed on the inner surface of the fixed template 2 and the moving template 3, respectively.

A bracket 5 of the fixed template is installed on one side of the fixed template 2 to fix the position of a cylinder body 7 into which oil is fed, and a bracket assembly 6 is installed on one side of the moving template 3 to fix the position of a piston rod 4 that can be inserted into the cylinder body 7. The cylinder body 7 and the piston rod 4 may be collectively referred to as a booster cylinder 9.

A flange 8 that is coupled with the bracket 5 by a predetermined fastening element is installed on the outer surface of the cylinder body 7. In detail, the flange 8 has, at the center part, a predetermined hole through which the cylinder body 7 passes. When the cylinder body 7 is inserted into the hole, the flange 8 and the cylinder body 7 are coupled together.

In addition, the flange 8 has a fastening hole 8a into which a predetermined fastening element as a bolt is inserted, and a key hole 8b into which a pin is inserted, formed in the front-rear direction. Also, the bracket 5 has holes corresponding to each of the fastening hole 8a and the key hole 8b.

The booster cylinder 9 is fixedly coupled to the fixed template 2 as follows. First, an operator fits the booster cylinder 9 having the coupled flange 8 into the bracket 5 of the fixed template. In this instance, the operator aligns the key hole 8b of the flange 8 with the key hole of the bracket 5, and inserts a pin into each key hole to position the flange 8 relative to the bracket 5.

Subsequently, the operator inserts a fastening element such as a bolt into the fastening hole 8a of the flange 8 and the fastening hole of the bracket 5 to couple the flange 8 to the bracket 5. Accordingly, the booster cylinder 9 can be fixedly connected to the fixed template 2.

However, when an operational tolerance occurs in the fit coupling of the booster cylinder 9 to the bracket 5, delicate coupling of the two components is not achieved. Further, in the connection process of the flange 8 and the bracket 5, after the coupling position of the two components is aligned by inserting the pin into the key hole 8b, the two components are coupled by inserting the fastening element into the fastening hole 8a, so the process is very complex and tedious. Even further, the fastening hole 8a and the key hole 8b are too weak to withstand kinetic energy of the piston rod 4 because they run through in the same horizontal direction as the movement direction of the piston rod 4 of the booster cylinder 9.

DISCLOSURE

Technical Problem

The present disclosure is directed to providing a clamping apparatus of an injection molding machine in which a booster cylinder that guides the movement of a moving template can be easily installed and firmly fixed to a fixed template.

Technical Solution

To solve the limitation and problem of the related art, the present disclosure provides a clamping apparatus of an injection molding machine, including a fixed template, a moving template moving back and forth relative to the fixed template, a plurality of flanges provided with a template fastening hole extending in the horizontal direction so as to be fixed to the fixed template, and a plurality of booster cylinders fixedly mounted on the plurality of flanges and guiding the back and forth movement of the movable template, wherein the fixed template has a plurality of ribs, projecting outward, installed on one surface thereof, each of the plurality of ribs is provided with a seating groove that is depressed inward, and each of the plurality of flanges is disposed in the seating groove to adjust the coupling positions of the plurality of booster cylinders with respect to the fixed template.

Additionally, the clamping apparatus of an injection molding machine may be provided, wherein the plurality of flanges of the present disclosure includes a first flange formed on one surface in the horizontal direction of the fixed template and a second flange formed on the other surface in the horizontal direction of the fixed template, the plurality of booster cylinders includes a first booster cylinder fixedly installed at the first flange and a second booster cylinder fixedly installed at the second flange, and the plurality of ribs includes a first rib in which the first flange is disposed and a second rib in which the second flange is disposed.

Additionally, the clamping apparatus of an injection molding machine may be provided, wherein the first flange and the second flange of the present disclosure are disposed such that the first flange and the second flange face each other with respect to the fixed template, or the first flange and the second flange do not face each other with respect to the fixed template.

Additionally, after the plurality of flanges of the present disclosure are disposed in the seating grooves, a fastening element may be inserted into the template fastening hole to couple the fixed template and the plurality of flanges.

Additionally, the plurality of booster cylinders of the present disclosure may include a cylinder body which is connected to the flange, and a piston rod which goes into or out of the cylinder body to move the moving template back and forth.

Additionally, the moving template of the present disclosure may have, on one side, a plurality of bracket assemblies which is connected to an end of the piston rod.

Additionally, the plurality of bracket assemblies of the present disclosure may include a coupler extending from the booster cylinder, a bracket installed above and below the coupler, respectively, and a connection pin connecting the coupler to the bracket.

Additionally, a protrusion extending toward the moving template may be formed on one side of the bracket of the present disclosure, and the moving template may have a wing with a recess that is depressed inward to seat the protrusion.

Additionally, each of the bracket and the wing of the present disclosure may have a fastening hole extending in the horizontal direction, through which a predetermined fastening element passes.

Additionally, a cover having a screw thread formed herein for screw coupling with the booster cylinder may be installed in front or rear of the flange of the present disclosure.

Additionally, a screw thread may be formed on one side of an inner surface of the flange of the present disclosure for screw coupling with a screw thread formed on an outer surface of the booster cylinder.

Additionally, each of the cover and the flange of the present disclosure may have a connection hole in front-rear direction, into which a fastening element is inserted, and the flange, the cover and the booster cylinder may be coupled to one another by insertion of the fastening element into the connection holes.

Advantageous Effects

According to the proposed present disclosure, as the flange coupled to the booster cylinder is fixedly connected to the fixed template through a fastening element, such as a bolt, in direct contact with the fixed template, the booster cylinder can be easily installed at the fixed template.

In addition, the fastening element for coupling the flange and the fixed template together is inserted in the horizontal direction through the template fastening hole formed in the flange, thereby efficiently responding to kinetic energy and impact of the piston rod moving back and forth.

BEST MODE

Hereinafter, exemplary embodiments of the present disclosure will be described with reference to the accompanying drawings. The present disclosure is described with reference to the embodiments shown in the drawings, but this is described as one embodiment, and the technical spirit of the present disclosure and its essential elements and operation is not limited thereby.

Figure 3:
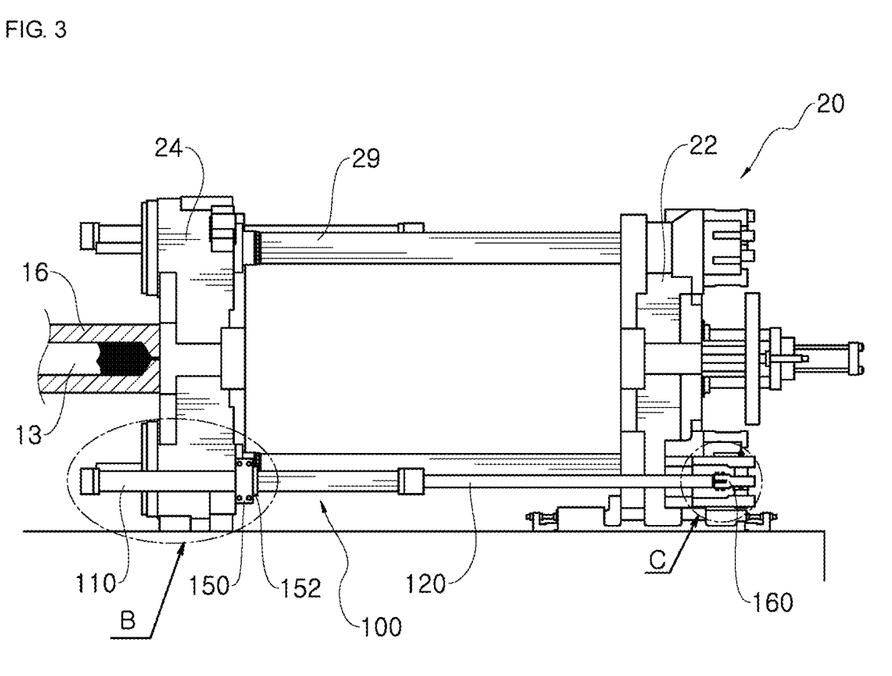
FIG. 3 is a diagram showing a clamping apparatus of an injection molding machine according to an embodiment of the present disclosure.

FIG. 3 is a diagram showing a clamping apparatus of an injection molding machine according to an embodiment of the present disclosure.

The injection molding machine according to the present disclosure includes an injection apparatus and a clamping apparatus 20. The injection apparatus is well known in the field of hydraulic injection molding machine and is irrelevant to the key feature of the present disclosure, and its detailed description is omitted herein.

The clamping apparatus 20 is supplied with molten resin from the injection apparatus by the advancing or retracting motion of a screw 13 within a barrel 16 which is a component of the injection apparatus. Additionally, the clamping apparatus 20 has a fixed template 24, and a moving template 22 for opening or closing the mold. In detail, the mold which provides a molding space inside is installed at each of the fixed template 24 and the moving template 22.

The moving template 22 and the fixed template 24 are connected by a tie bar 29. The moving template 22 can make a sliding or translational motion along the tie bar 29.

Additionally, a plurality of booster cylinders 100 is installed at the sides of the fixed template 24 and the moving template 22 to guide the back and forth movement of the moving template 22 relative to the fixed template 24. The plurality of booster cylinders 100 extends straight in the front-rear direction, and have a structure in which one side is fixed to the fixed template 24 by each of a plurality of flanges 150, and the other side is fixed to the moving template 22 by each of a plurality of bracket assemblies 160.

In the specification, the front-rear direction refers to a direction from the fixed template 24 toward the moving template 22 or a reverse direction thereof. Additionally, the horizontal direction refers to a direction perpendicular to the front-rear direction on the plane.

Each of the plurality of booster cylinders 100 includes a cylinder body 110 fixed to the fixed template 24, and a piston rod 120 fixed to the moving template 22. The cylinder body 110 is coupled to the fixed template 24 by the flange 150 fixedly installed at one side of the fixed template 24. Additionally, the piston rod 120 is coupled to the moving template 22 by the bracket assembly 160 fixedly installed at one side of the moving template 22.

Figure 4:
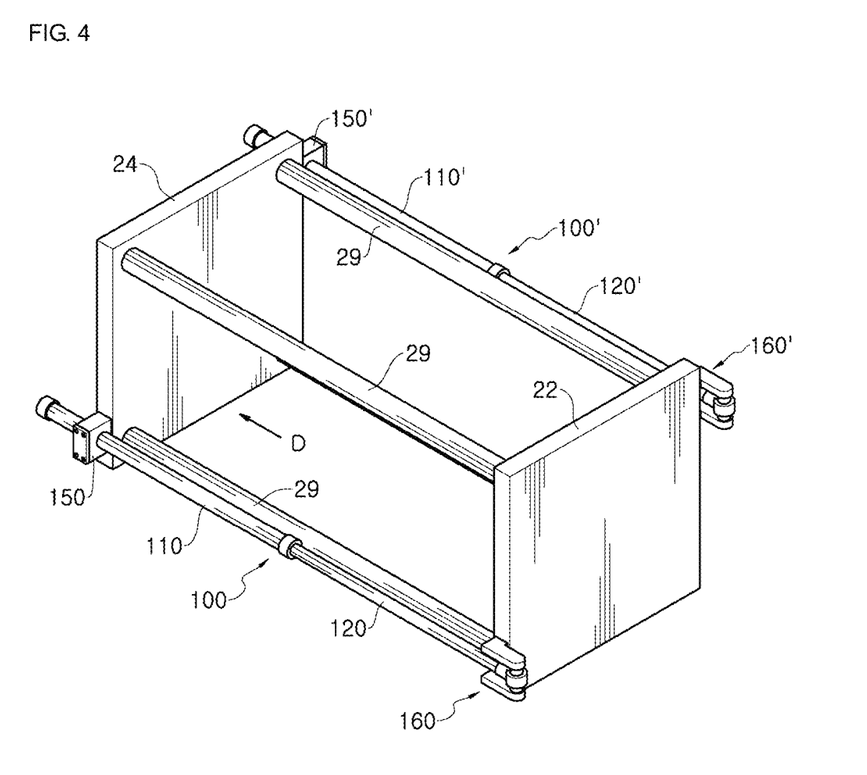
FIG. 4 is a schematic perspective view showing the placement position of a flange and a booster cylinder of an injection molding machine according to an embodiment of the present disclosure.
Figure 5:
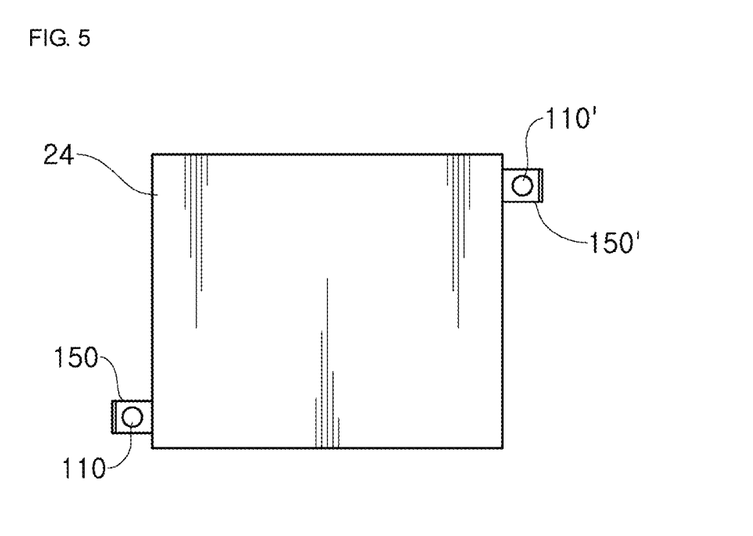
FIG. 5 is a conceptual diagram showing the position of a first flange and a second flange installed at a fixed template when viewed from D of FIG. 4.

FIG. 4 is a schematic perspective view showing the placement position of the flange 150 and the booster cylinder 100 of the injection molding machine according to an embodiment of the present disclosure, and FIG. 5 is a conceptual diagram showing the position of a first flange 150 and a second flange 150' each seated in the plurality of ribs 25 of the fixed template 24 when viewed from D of FIG. 4

As shown in FIGS. 4 and 5, the clamping apparatus 20 according to an embodiment of the present disclosure may include the first flange 150 formed on one surface in the horizontal direction of the fixed template 24, and the second flange 150' formed on the other surface in the horizontal direction of the fixed template 24.

Meanwhile, in an embodiment of the present disclosure shown in FIGS. 4 and 5, the first flange 150 is disposed at the lower part of the left surface of the fixed template 24, and the second flange 150' is disposed at the upper part of the right surface of the fixed template, and thus the first flange 150 and the second flange 150' are arranged in the diagonal direction.

However, to prevent the interference between the clamping apparatus 20 of the present disclosure and other external devices and ensure the operator's accessibility into the clamping apparatus 20 to replace the tie bar 29, the position of the first flange 150 and the second flange 150' may be changed.

Accordingly, by changing the position of the first flange 150 and the second flange 150', the position of the first booster cylinder 100 and the second booster cylinder 100' coupled to the fixed template 24 through the first flange 150 and the second flange 150' may be changed, which makes it possible to change the accessibility into the clamping apparatus 20.

Figure 6A:
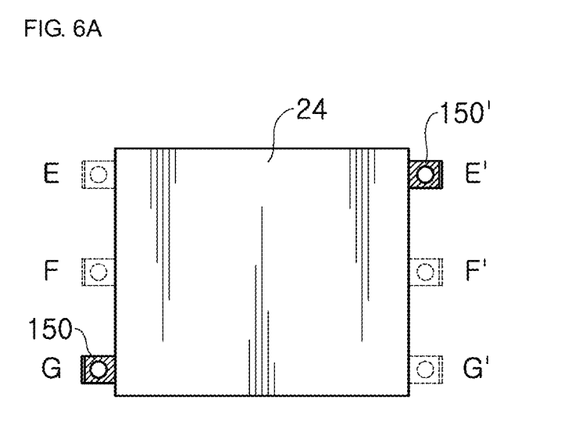
FIG. 6A to FIG. 6F are conceptual diagrams showing examples of position modifications of a first flange and a second flange installed at a fixed template according to an embodiment of the present disclosure.

Various examples of position modifications of the first flange 150 and the second flange 150' are shown in FIG. 6A to FIG. 6F. FIG. 6A is a schematic diagram showing the first flange 150 of FIG. 5 disposed at the position G and the second flange 150' disposed at the position E'.

Figure 6B:
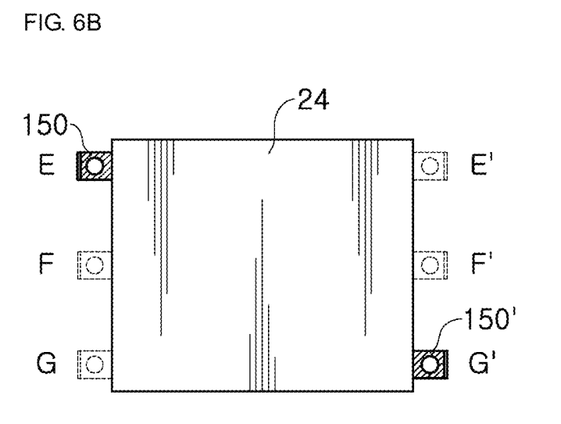

Additionally, as shown in FIG. 6B, the position of the first flange 150 and the second flange 150' with respect to the fixed template 24 may be opposite to that of FIG. 5, that is, the first flange 150 may be disposed at the position E on the upper part of the left surface of the fixed template 24, and the second flange 150' may be disposed at the position G' on the lower part of the right surface of the fixed template, and likewise, the first flange 150 and the second flange 150' may be configured in the diagonal direction.

Figure 6C:
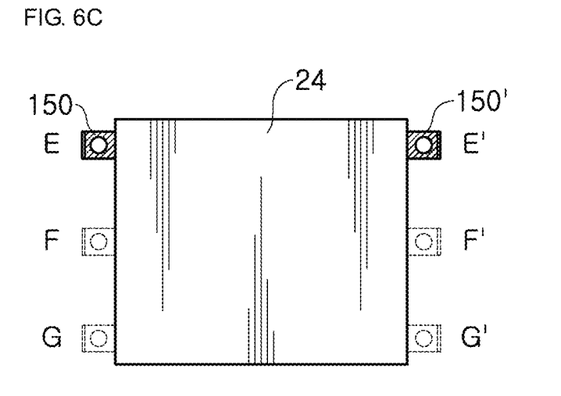
Figure 6D:
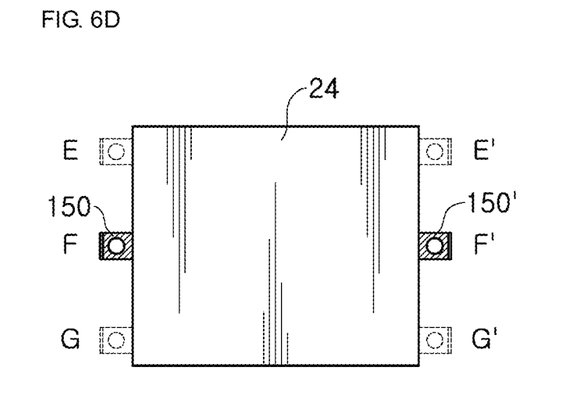
Figure 6E:
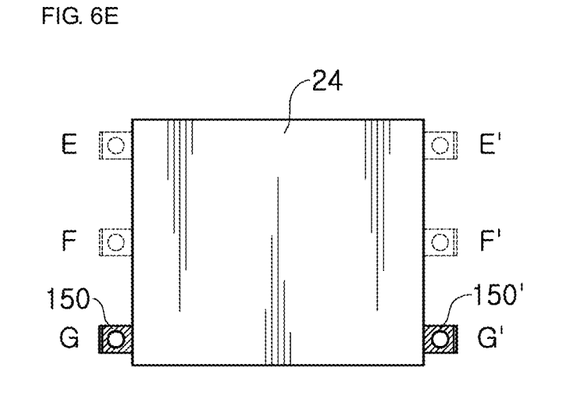

Additionally, as shown in FIGS. 6(C) to 6(E), the first flange 150 and the second flange 150' coupled to the fixed template 24 may be disposed such that they face each other to achieve parallel coupling in the horizontal direction of the fixed template 24.

Figure 6F:
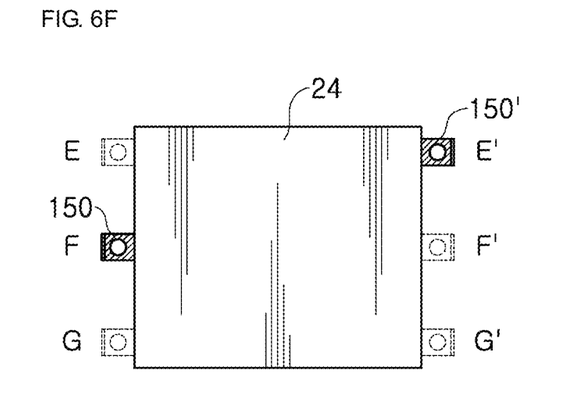

Meanwhile, the first flange 150 and the second flange 150' may be disposed such that they do not face each other. For example, as shown in FIG. 6F, the first flange 150 may be disposed at the position F on the center part of the left surface of the fixed template 24 to ensure coupling of the center part of the fixed template 24, and the second flange 150' may be disposed at the position E' on the upper part of the right surface of the fixed template 24 to prevent the interference with other device that may occur at the position F' or G' of FIG. 6F or ensure accessibility from under the position E'.

FIGS. 6(A) to 6(F) show the positional relationship between the first flange 150 and the second flange 150' for illustration purposes only, and the positional relationship between the first flange 150 and the second flange 150' may be changed to other combinations not shown in FIGS. 6(A) to 6(F).

Additionally, although FIGS. 6(A) to 6(F) show the position of the first flange 150 as three positions E to G and the position of the second flange 150' as three positions E' to G', the number of positions is not limited thereto, and various modifications may be made to the number of placement positions of the first flange 150 and the number of placement positions of the second flange 150' according to operation environments.

Hereinafter, the coupling structure in which the booster cylinder 100 is fixedly installed at the fixed template 24 is described. For reference, the first flange 150 and the second flange 150' related to the first booster cylinder 100 and the second booster cylinder 100' are installed at the fixed template 24 by the same method, but only different in installation location, and below will be only described as the "booster cylinder 100" and the "flange 150".

Figure 7:
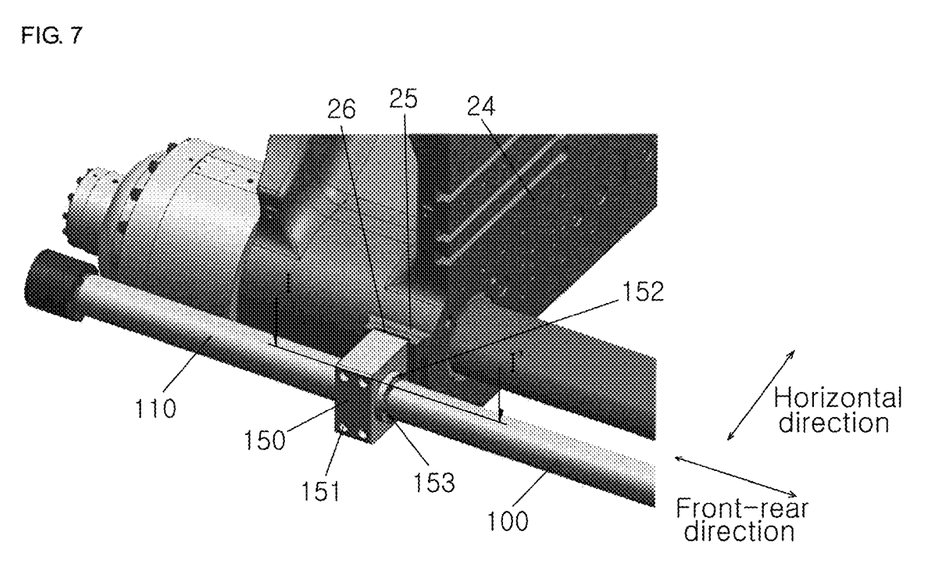
FIG. 7 is an enlarged view of section B of FIG. 3.
Figure 8:
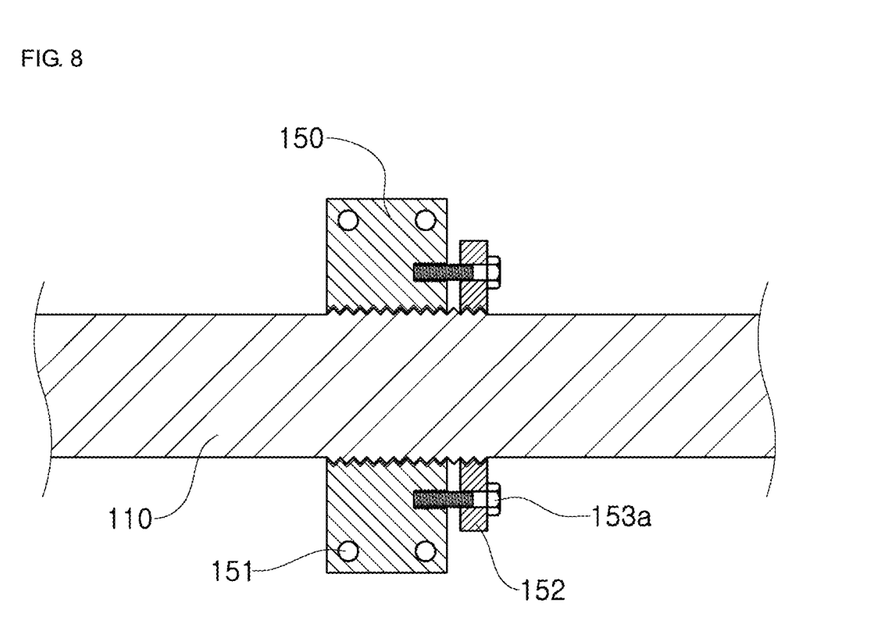
FIG. 8 is a cross-sectional view taken along the line I-I' of FIG. 7 when viewed from the front side.

FIG. 7 is an enlarged view of section B of FIG. 3, showing the coupling structure of the booster cylinder 100 and the fixed template 24. Additionally, FIG. 8 is a cross-sectional view taken along the line I-I' of FIG. 7 when viewed from the front side.

Describing with reference to the drawings, the first flange 150 is fixedly coupled to the cylinder body 110, and then, is connected to one side of the fixed template 24. In detail, a cover 152 molded integrally with the flange 150 is formed on one surface facing in the front-rear direction of the flange 150.

A screw thread is formed on the inner surface of the cover 152 and the inner surface of the flange 150 in part for screw coupling with the cylinder body 110. That is, when the screw thread formed on the inner surface of the flange 150 is engaged with a screw thread formed on the outer surface of the cylinder body 110, the coupling position of the flange 150 with the cylinder body 110 may be determined. Subsequently, when the screw thread formed on the inner surface of the cover 152 is engaged with the screw thread formed on the outer surface of the cylinder body 110, the coupling position of the cover 152 with the cylinder body 110 is determined. In this instance, the cover 152 is installed by about 1 mm in the front-rear direction relative to the flange 150. In this situation, the operator couples the cover 152 and the flange 150 through a fastening element such as a bolt. In detail, each of the cover 152 and the flange 150 has a connection hole 153 at their corresponding locations, and when the fastening element passes through the connection hole formed in the cover 152 and the connection hole formed in the flange 150 in a sequential order, the cover 152 and the flange 150 are coupled together. Accordingly, integral coupling of the booster cylinder 100, the flange 150 and the cover 152 is achieved.

The structure in which the flange 150 whose position is fixed in this way is fixedly installed at one side of the fixed template 24 is as follows.

The rib 25 projecting outward is installed at one surface of the fixed template 24. Additionally, the rib 25 has a seating groove 26 that is depressed inward.

To fix the booster cylinder 100 to the fixed template 24, first, the operator places the flange 150 coupled with the booster cylinder 100 in the seating groove 26. According to the related art, for coupling position alignment between the flange and the fixed template, each of the flange and the fixed template needs a separate key hole for inserting a pin. However, according to the present disclosure, by placing the flange 150 in the seating groove 26, the coupling position of the booster cylinder 100 with the fixed template 24 can be adjusted, which does not require a separate key hole and achieves an easy coupling operation.

The flange 150 has a template fastening hole 151 that runs therethrough extending in the horizontal direction. The template fastening hole 151 is a component into which a fastening element such as a bolt is inserted. Additionally, the fixed template 24 also has a predetermined fastening hole, in which the fastening element is inserted, at a corresponding location to the template fastening hole 151.

When the fastening element passes through the template fastening hole 151 of the flange 150 and the fastening hole of the fixed template 24 in a sequential order, the flange 150 is fixedly coupled to the fixed template 24. That is, after the flange 150 is placed in the seating groove 26, when the fastening element is inserted into the template fastening hole 151, the booster cylinder 100 is fixedly installed at the fixed template 24.

As described above, according to the present disclosure, as the fastening element for coupling the flange 150 and the fixed template 24 together is inserted in the horizontal direction through the template fastening hole 151 formed in the flange 150, it is possible to efficiently respond to kinetic energy and impact of the piston rod 120 moving back and forth.

Figure 9:
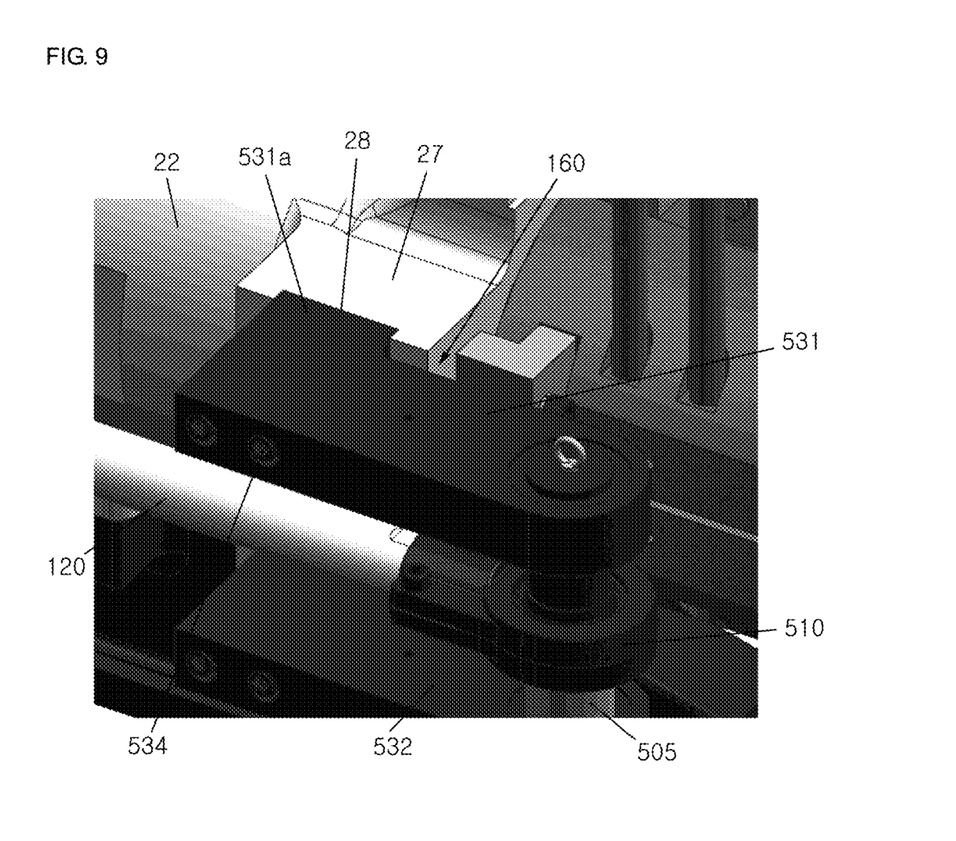
FIG. 9 is an enlarged view of section C of FIG. 3.

Hereinafter, the bracket assembly 160 connected to the end of the piston rod 120 is described.

FIG. 9 is an enlarged view of section C of FIG. 3. Describing with reference to FIG. 9, the bracket assembly 160 that allows the piston rod 120 to extend forward is installed at the end of the piston rod 120. In detail, the bracket assembly 160 includes a connection pin 505, a coupler 510 and brackets 531, 532. The detailed description of the bracket assembly 160 is as follows.

First, the coupler 510 is a component that extends forward from the end of the piston rod 120, and the piston rod 120 and the coupler 510 may be integrally manufactured, and after each is separately manufactured, they may be coupled to each other by welding, screwing, or the like.

The coupler 510 has, at the center part, a through-hole having a hollow shape along the vertical direction. The connection pin 505 extending in the vertical direction is inserted into the through-hole. Additionally, the coupler 510 is disposed around the center part of the connection pin 505 with respect to the vertical direction.

The brackets 531, 532 coupled with a wing 27 formed on one side of the moving template 22 are each installed above and below the coupler 510. The brackets 531, 532 serve to transfer a force generated by the booster cylinder 100 to the moving template 22. Accordingly, the force generated by the booster cylinder 100 is transferred to the moving template 22 through the piston rod 120, the coupler 510, the connection pin 505 and the brackets 531, 532 to operate the moving template 22.

In detail, in opening or closing the mold, the force generated by the booster cylinder 100 is transferred to the piston rod 120, and the coupler 510 installed at the end of the piston rod 120 receives this force. As the connection pin 505 is inserted into the through-hole formed in the coupler 510, the force acting on the coupler 510 is transferred to the connection pin 505, and the brackets 531, 532 coupled with the connection pin 505 receive this force. As each of the brackets 531, 532 is coupled to the wing 27, as a result, the force is transferred to the moving template 22 through the brackets 531, 532, and the moving template 22 can move.

The brackets include the upper bracket 531 installed above the coupler 510 and coupled to the upper part of the wing 27, and the lower bracket 532 installed below the coupler 510 and coupled to the lower part of the wing 27.

Additionally, the upper bracket 531 and the lower bracket 532 have a predetermined hole that provides a pathway along which the connection pin 505 passes through. That is, the upper part of the connection pin 505 is fixed by the upper bracket 531, and the lower part of the connection pin 505 is fixed by the lower bracket 532.

The wing 27 has a recess 28 that is depressed toward the moving template 22. Additionally, the upper bracket 531 has a protrusion 531a that is seated in the recess 28. Likewise, the lower bracket 532 also has a protrusion that is seated in the recess 28.

The wing 27 and the brackets 531, 532 are coupled by a fastening element 534 such as a bolt. That is, each of the wing 27 and the brackets 531, 532 has a fastening hole extending in the horizontal direction at their corresponding locations, and when the protrusions of the brackets 531, 532 are seated in the recesses 28, and then, the fastening element 534 passes through the fastening hole of the bracket and the fastening hole of the wing in a sequential order, the bracket assembly 160 is fixed to the moving template 22.

Hereinafter, the operation of the booster cylinder 100 installed in this way will be described in detail.

Figure 10:
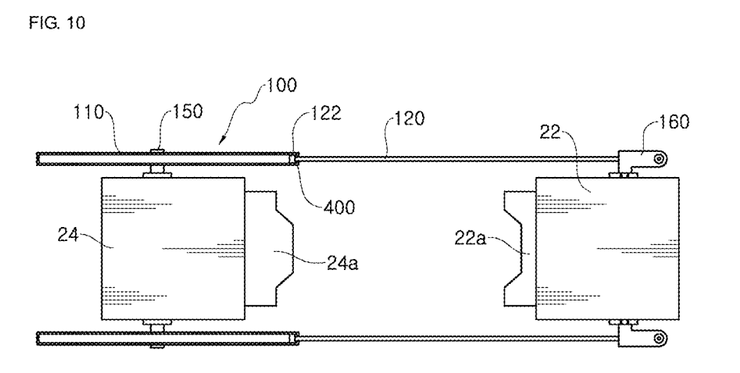
FIG. 10 is a diagram showing the operation of a booster cylinder of the clamping apparatus when opening a mold.

FIG. 10 is a diagram showing the operation of the booster cylinder of the clamping apparatus when opening the mold. Additionally, FIG. 11 is a diagram showing the operation of the booster cylinder when closing the mold.

First, as shown in FIG. 10, to open the mold by the operation of the clamping apparatus 20, the hydraulic pressure is supplied to a mold opening compressed fluid chamber 300. In detail, a stopper 122 having a corresponding width to the width of the cylinder body 110 is installed at the end of the piston rod 120. That is, the stopper 122 serves to divide the internal space of the cylinder body 110 into the mold opening compressed fluid chamber 300 and a mold closing compressed fluid chamber 400.

When the hydraulic pressure is supplied to the mold opening compressed fluid chamber 300, the stopper 122, i.e., the piston rod 120 moves forth (in a direction from the fixed template 24 toward the moving template 22). As the piston rod 120 moves forth, the moving template 22 connected to the bracket assembly 160 with the piston rod 120 also moves forth. When the moving template 22 moves in a direction facing away from the fixed template 24, the moving mold 22a and the fixed mold 24a are opened.

Figure 11:
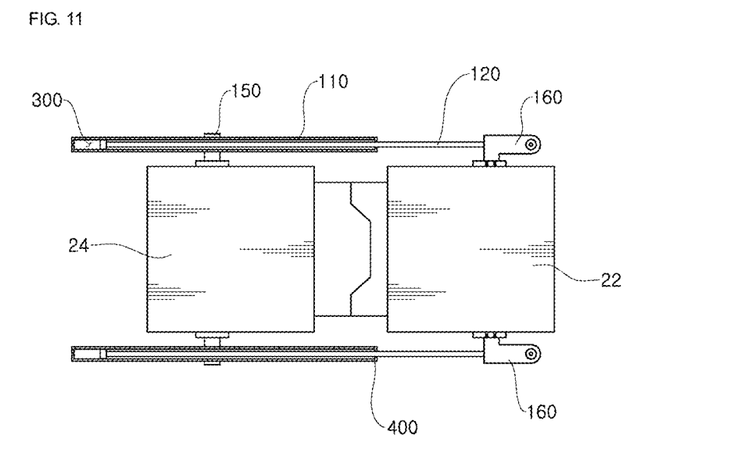
FIG. 11 is a diagram showing the operation of the booster cylinder when closing a mold.

On the contrary, as shown in FIG. 11, to close the mold by the operation of the clamping apparatus 20, the hydraulic pressure is supplied to the mold closing compressed fluid chamber 400. When the hydraulic pressure is supplied to the mold closing compressed fluid chamber 400, the stopper 12, i.e., the piston rod 120 moves back (in a direction from the moving template 22 toward the fixed template 24). As the piston rod 120 moves back, the moving template 22 connected to the bracket assembly 160 with the piston rod 120 also moves back. When the moving template 22 moves in a direction approaching the fixed template 24, the moving mold 22a and the fixed mold 24a are closed.

As described above, according to the present disclosure, as the flange 150 of the booster cylinder 100 is fixedly connected to the fixed template 24 through the fastening element, such as a bolt, in direct contact with the fixed template 24, the booster cylinder 100 can be easily and firmly installed at the fixed template 24.

The technical spirit of the present disclosure has been hereinabove described for illustration purposes only, and it is obvious to those skilled in the art that various changes and modifications may be made thereto without departing from the essential feature of the present disclosure. Accordingly, the disclosed embodiments are intended to describe the technical spirit of the present disclosure, but not intended to be limiting, and the scope of technical spirit the present disclosure is not limited by these embodiments. The scope of protection of the present disclosure should be interpreted by the appended claims, and the full technical spirit within the equivalent scope should be interpreted as falling in the scope of protection of the present disclosure.

INDUSTRIAL APPLICABILITY

The present disclosure provides the clamping apparatus of the injection molding machine in which the booster cylinder can be easily installed at the fixed mold.

Additionally, the present disclosure provides the clamping apparatus of the injection molding machine that can efficiently respond to kinetic energy and impact of the piston rod moving back and forth.

The invention claimed is:

1. A clamping apparatus of an injection molding machine, comprising:
    a fixed template;
    a moving template moving back and forth relative to the fixed template;
    a plurality of flanges provided with a template fastening hole extending in the horizontal direction so as to be fixed to the fixed template; and
    a plurality of booster cylinders fixedly mounted on the plurality of flanges and guiding the back and forth movement of the movable template,
    wherein the fixed template has a plurality of ribs, projecting outward, installed on one surface thereof,
    each of the plurality of ribs is provided with a seating groove that is depressed inward, and
    each of the plurality of flanges is disposed in the seating groove to adjust the coupling positions of the plurality of booster cylinders with respect to the fixed template.

2. The clamping apparatus of an injection molding machine according to claim 1, wherein the plurality of flanges includes a first flange formed on one surface in the horizontal direction of the fixed template and a second flange formed on the other surface in the horizontal direction of the fixed template,
    the plurality of booster cylinders includes a first booster cylinder fixedly installed at the first flange and a second booster cylinder fixedly installed at the second flange, and
    the plurality of ribs includes a first rib in which the first flange is disposed and a second rib in which the second flange is disposed.

3. The clamping apparatus of an injection molding machine according to claim 2, wherein the first flange and the second flange are disposed such that the first flange and the second flange face each other with respect to the fixed template.

4. The clamping apparatus of an injection molding machine according to claim 2, wherein the first flange and the second flange are disposed such that the first flange and the second flange do not face each other with respect to the fixed template.

5. The clamping apparatus of an injection molding machine according to claim 1, wherein after the plurality of flanges are disposed in the seating grooves, a fastening element is inserted into the template fastening hole to couple the fixed template and the plurality of flanges.

6. The clamping apparatus of an injection molding machine according to claim 5, wherein the plurality of booster cylinders comprises:
    a cylinder body which is connected to the flange; and
    a piston rod which goes into or out of the cylinder body to move the moving template back and forth.

7. The clamping apparatus of an injection molding machine according to claim 6, wherein the moving template has, on one side, a plurality of bracket assemblies which is connected to an end of the piston rod.

8. The clamping apparatus of an injection molding machine according to claim 7, wherein the plurality of bracket assemblies comprises:
    a coupler extending from the booster cylinder;
    a bracket installed above and below the coupler, respectively; and
    a connection pin connecting the coupler to the bracket.

9. The clamping apparatus of an injection molding machine according to claim 8, wherein a protrusion extending toward the moving template is formed on one side of the bracket, and
    the moving template has a wing with a recess that is depressed inward to seat the protrusion.

10. The clamping apparatus of an injection molding machine according to claim 9, wherein each of the bracket and the wing has a fastening hole extending in the horizontal direction, through which a predetermined fastening element passes.

11. The clamping apparatus of an injection molding machine according to claim 5, wherein a cover having a screw thread formed therein for screw coupling with the booster cylinder is installed in front or rear of the flange.

12. The clamping apparatus of an injection molding machine according to claim 11, wherein a screw thread is formed on one side of an inner surface of the flange for screw coupling with a screw thread formed on an outer surface of the booster cylinder.

13. The clamping apparatus of an injection molding machine according to claim 12, wherein each of the cover and the flange has a connection hole in front-rear direction, into which a fastening element is inserted, and
    the flange, the cover and the booster cylinder are coupled to one another by insertion of the fastening element into the connection holes.

* * * * *